Feb. 6, 1968 A. STANFORD ET AL 3,367,225
TRIMMER ASSEMBLY
Original Filed May 26, 1959 4 Sheets-Sheet 1
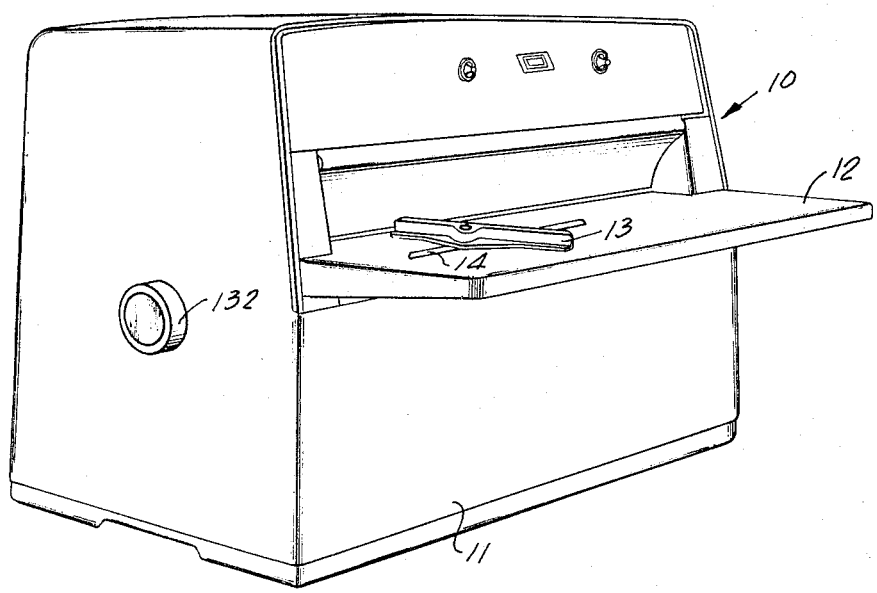
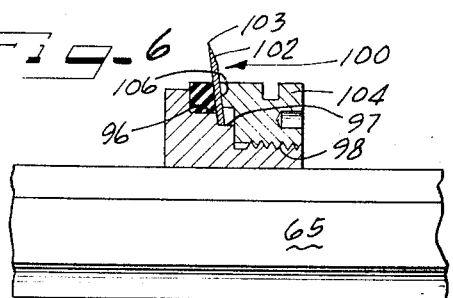
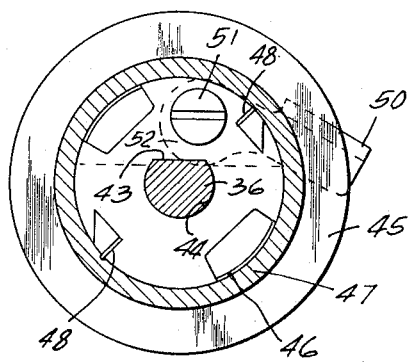
INVENTORS
ARTHUR STANFORD
PAUL W. NORMAN
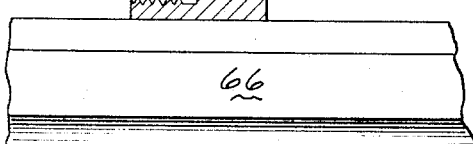
ATTORNEYS

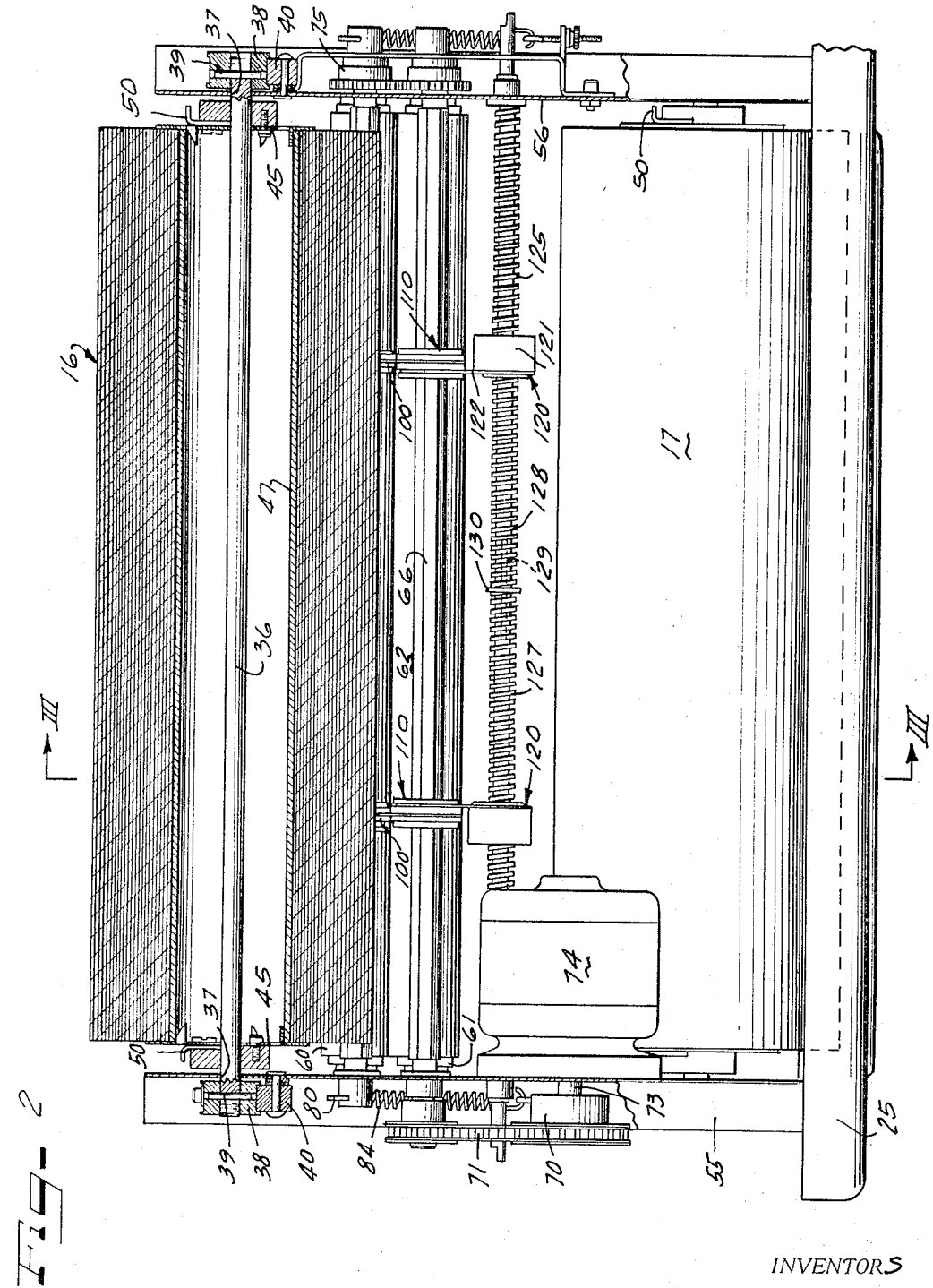

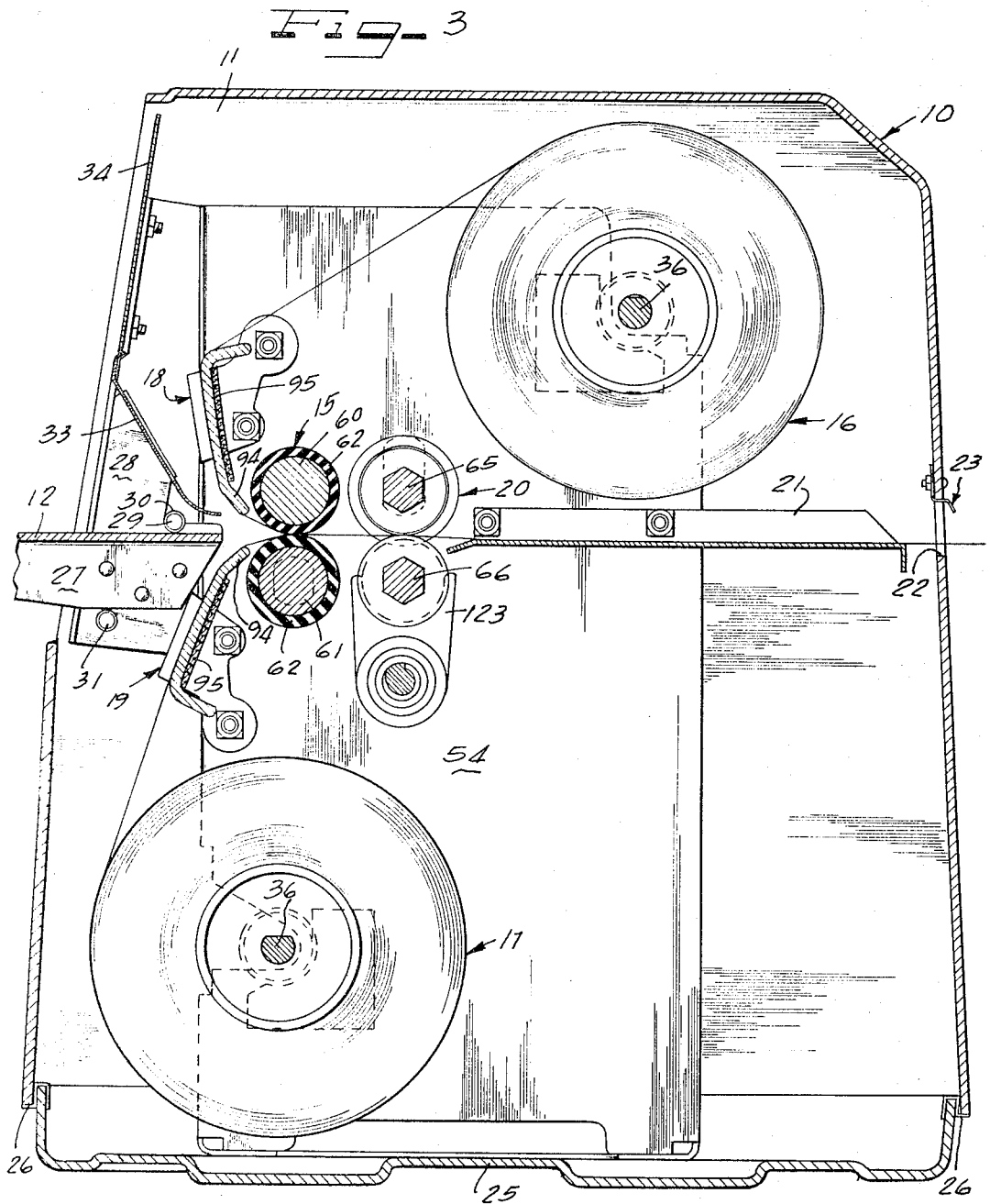

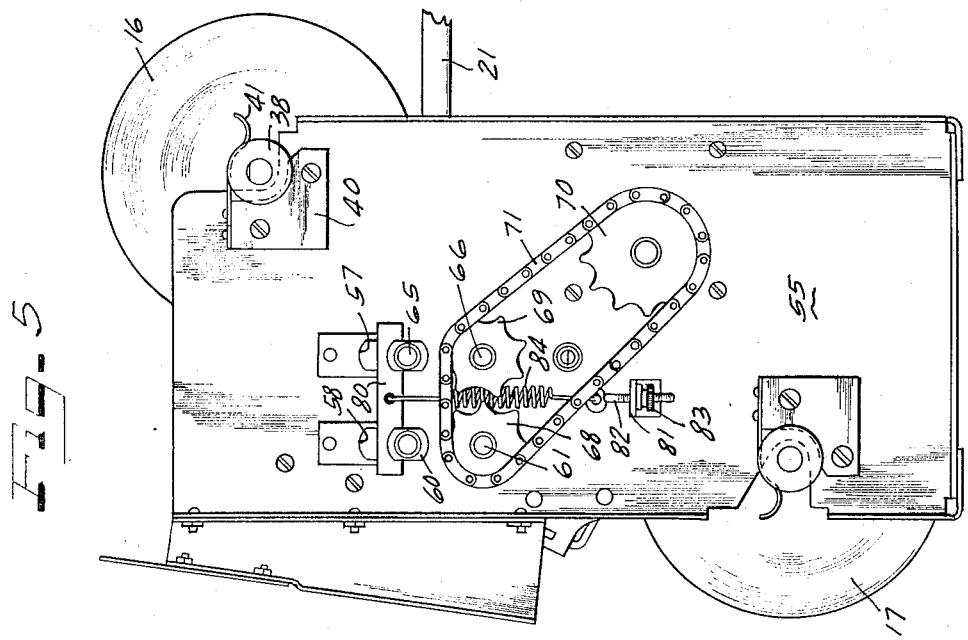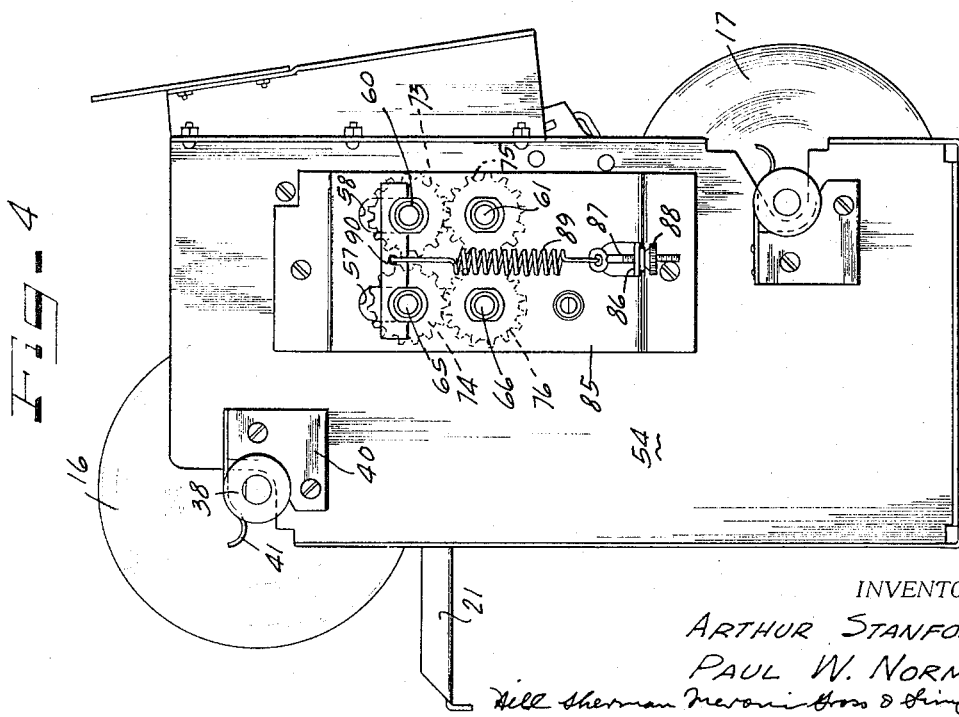

United States Patent Office 3,367,225
Patented Feb. 6, 1968

3,367,225
TRIMMER ASSEMBLY
Arthur Stanford, Bensenville, and Paul W. Norman, Glenview, Ill., assignors to General Binding Corporation, Northbrook, Ill., a corporation of Illinois
Original application May 26, 1959, Ser. No. 815,904. Divided and this application Sept. 10, 1963, Ser. No. 311,277
3 Claims. (Cl. 83—499)

This invention relates to a laminating assembly and a method of laminating and more particularly relates to a means and method for cohesively uniting a plurality of relatively thin sheets with one another.

This application is a division of application Ser. No. 815,904, filed May 26, 1959, now abandoned.

While the present invention is not to be construed as being so limited, it finds particular utility in instances wherein it is desired to protect a sheet of paper or the like with a plastic transparent film or sheet bonded thereto. If a paper sheet has a plastic film bonded thereto on opposite sides thereof, the paper will retain its clarity with age and will be relatively impervious to moisture while resisting wear and protecting the paper from tampering.

Means have, of course, already been devised for encasing paper sheets within rigid plastic cases but the present invention is directed to a means and method for bonding a flexible plastic sheet or film to a paper sheet or the like wherein the paper sheet is actually cohesively united with the plastic sheets.

We have found that Mylar polyester film having one of its surfaces coated with a polyethylene adhesive which becomes tacky when subjected to heat may be satisfactorily used as a plastic protective sheeting if a transparent protective sheet is desired. Mylar polyester film, manufactured by E. I. du Pont de Nemours & Company, is a highly durable, transparent, water-repellent film of polyethylene terephthalate resin which is characterized by outstanding strength, electrical properties and chemical inertness and which may, for convenience, be stored in rolls. It will, however, be understood that other substances could be used depending upon the type of finished product desired. The adhesive substance used preferably comprises a substance which becomes tacky when subjected to heat but which is not normally tacky thereby permitting the material upon which it is coated to be stored in rolls.

The method of laminating which we have devised may be generally outlined as follows: A transparent Mylar sheet having a heat sensitive adhesive coating is heated to a sufficient degree to plasticize the adhesive and thereafter the plasticized adhesive surface of the Mylar is impressed onto the paper sheet to be laminated under a slight pressure.

Heating of the Mylar sheet is effected at a point remotely disposed from the paper so that the paper will be protected from the heat. Subsequent to the cohesion of the paper with the Mylar sheet the edges of the laminated article are then trimmed as desired. The adhesive coating on the Mylar when heated and thereafter impressed onto the paper sheet will adhere to the paper and make a secure bond between the sheets. The paper sheet may have a protective sheet of Mylar secured thereto on one or both sides thereof as desired.

The laminating assembly for effecting the above process comprises in general a casing which has a pair of rolls of Mylar film disposed therein which are coated on one side with a thermal adhesive and has a pair of tangentially positioned rollers journalled therein through which the paper to be preserved and the Mylar sheets are drawn.

The coated Mylar passes from each of the rolls over heater shoes which are disposed at points remote from the rollers. It will here be noted that it has generally been the practice in the past to effect heating of plastic sheets to plasticize the adhesive coating thereon by means of direct application of heat through the rollers. We have found it advantageous, however, to effect heating of the plastic film by using a pair of remotely located heater shoes so that the paper or the other article to be preserved will not be subjected to the relatively intense heat necessary to plasticize the adhesive coating in short intervals of time.

The paper sheet to be preserved is fed into the laminating assembly at the point wherein the adhesive coated Mylar from each of the rolls passes through the rollers so that as soon as the sheet has been inserted into the point of tangency between the rollers the motor driven rollers will act to move the sheet on through the machine. It will, of course, be understood that the Mylar passing from each of the rolls is so wound on the rolls and directed through the laminating assembly that the adhesive coated surfaces face one another at the point wherein the Mylar and the paper sheets are directed through the rollers.

The rollers are resiliently tangentially mounted with respect to one another within the casing and are maintained in such relation under a slight pressure so that when the Mylar from each of the respective Mylar rolls and the paper sandwiched between the Mylar passes through the rollers the plasticized adhesive coated surfaces of the Mylar will be impressed onto the sheet on opposite sides thereof.

The aforementioned process constitutes the laminating process per se. Subsequent to passage of the laminated sheet through the rollers the longitudinal edges of the laminated paper pass through slitters or trimmers which cut the longitudinal edges thereof and trim the laminated material to the desired size.

Each of the trimmers or slitters comprises generally a cutting blade and a rotating anvil within which the peripheral edge of the cutting blade rides.

The slitters or trimmers on each side of the casing are axially movable along their mounting shafts within the casing and such axial movement is effected by means of an adjustable yoke assembly which engages the anvil and which is mounted on a threaded shaft to provide a means for positioning the slitters within the casing as desired.

Rotation of the Mylar rolls is resisted by means of bearing blocks having friction springs mounted thereon which are engageable with the shafts upon which the rolls are mounted to prevent accidental unrolling of the Mylar rolls.

The cutting blade shaft and upper roller shaft are resiliently biased toward the anvil shaft and the lower roller shaft, respectively, by means of a tension spring so that the rollers and the cutting blade and anvil can move relatively away from one another when the thickness of the laminated member passing therethrough is great.

The lower roller and the anvil shaft are both chain driven from a power source while the upper roller and the cutting blade shaft are gear driven by their respective co-operating chain driven components.

Another object of the invention is to provide a laminating assembly of the type above described wherein slitters or trimmers are used to trim the longitudinal edges of the laminated sheet as it passes through the laminating assembly and where in these slitters or trimmers are selectively adjustable along an axis substantially perpendicular to the direction of travel of the laminated sheets through the laminating assembly.

A still further object of the invention resides in the provision of a laminating assembly of the type generally described above wherein the rollers and slitter components are resiliently biased into tangential relation with one another in such a manner that the axes of the respective rollers and slitters can have relative movement away from one another to accommodate unusually thick pieces of material which may be passed through the laminating assembly.

These and other objects of the invention will appear from time to time as the following specification proceeds and with reference to the accompanying drawings, wherein:

FIGURE 1 is a pictorial view of the casing for a laminating assembly constructed in accordance with the principles of the present invention;

FIGURE 2 is a rear view of the laminating assembly illustrated in FIGURE 1 showing portions thereof in rear elevation and others in vertical section;

FIGURE 3 is a vertical sectional view through the laminating assembly illustrated in FIGURES 1 and 2 and taken substantially along lines III—III of FIGURE 2;

FIGURE 4 is a side elevational view of one side of the laminating assembly wherein the outer casing has been removed to expose the interior components thereof including the means for driving the rollers and slitter shafts;

FIGURE 5 is a view which is similar in nature to FIGURE 4 but which shows the opposite side of the laminating assembly with the outer casing removed and particularly illustrating the chain drive to the lower roller shaft and the slitter block shaft;

FIGURE 6 is an enlarged fragmental view showing a trimmer assembly in vertical section; and FIGURE 7 is a vertical sectional view through a roll carrier shaft which illustrates a roll carrier plate in side elevation and which shows the cam lever for locking the roll carrier plate to the roll carrier shaft.

As shown in the drawings, a laminating assembly 10 is shown in FIGURE 1 as including an outer casing 11 which has a feed table 12 extending outwardly from the front wall thereof. The feed table 12 has a guide 13 slidably mounted within a slot 14 therein and the guide is adjustable along the slot to position the paper to be laminated prior to passage through the machine.

Referring now particularly to FIGURE 3, the operating procedure of the laminating assembly may be briefly described as follows: A sheet of paper which is to be laminated may be inserted within the assembly on the feed table 12 which terminates within the laminating assembly at a point adjacent the point of tangency of a pair of motor driven rollers 15. A plastic film which is to be laminated on the paper sheet is wound on rolls 16 and 17 in the upper and lower portions of the casing 11, respectively, and passes through the motor driven rollers 15 after having passed over heater shoes 18 and 19. The adhesive material on the plastic films is plasticized as the plastic film passes over the heater shoes 18 and 19 so that when the plastic films pass through the rollers 15 on opposite sides of the sheet to be laminated, the plastic films and the paper sheet are sandwiched together and the laminating process is effected.

Subsequent to passage through the rollers 15, the longitudinal edges of the laminated sheet are then trimmed by means of slitters or trimmers 20 which are disposed at each side of the casing to trim the longitudinal edges of the laminated material. After the laminated sheet has been trimmed it then passes along a table 21 within the casing 11 and subsequently through an opening 22 in the rear of the casing 11. Thereafter, by pulling the laminated sheet upwardly the sheet will be cut by a cutter 23 which is disposed along the upper edge of the aperture 22 to separate the laminated sheet from the material still passing through the laminating assembly.

Referring now in more detail to the vertical sectional view illustrated in FIGURE 3, the casing 11 is mounted on a base 25 by means of a plurality of brackets 26 which fit over the upstanding walls of the base and which serve to support the lower edge of the casing 11. The feed plate 12 has a pair of depending legs 27 extending therefrom at each end thereof which are, in turn, riveted or otherwise rigidly secured to upstanding brackets 28. The brackets 28 are cooperable with the feed plate 12 to define semi-circular grooves 29. Upper and lower mounting pins 30 and 31, respectively, extend outwardly from the sidewalls of the casing 11 and are adapted to removably mount the feed plate 12 within the casing 11. It will be observed that the feed plate 12 is maintained in its proper position within the casing 11 by means of abutment of the lower edge of the depending leg 27 with the pin 31 and by the pin 30 which fits within the groove 29. By tilting the outer end of the feed plate 12 upwardly, the groove 29 will be displaced from the pin 30 and the entire feed plate assembly may then be removed from the casing 11.

A baffle plate 33 is connected to the upper end of the bracket 28 and terminates at a point adjacent the end of the feed table to properly direct the sheets to be laminated into the point of tangency by the rollers 15.

The front wall 34 of the casing 11 comprises, for the sake of convenience in assemblage, a separate member which is secured at its ends and which may be medially secured if so desired to the casing 11 by any suitable mounting means.

As shown in FIGURES 2–5, a roll shaft 36 extends lengthwise of the housing 11 and has its opposite ends loosely journalled for rotatable movement in a pair of coaxially aligned apertures 37 in the sidewalls 54 and 55 of the casing 11. For convenience the sidewalls 54 and 55 including the base are also referred to as a casing or inner casing. Friction bearings 38 are mounted on the opposed ends of the shaft 36 and are keyed thereto by pins 39 which extend through openings disposed in registry with one another and formed in the friction bearings 38 and the shaft 36, respectively. The friction bearings 38 are, in turn, journalled within bearing blocks 40 which are secured by rivets to the outer surfaces of the sidewalls of the inner casing 54. Actually two roll shafts are journalled within the inner casing within upper and lower portions of the laminating assembly but each are identically mounted within the inner casing.

As shown most clearly in FIGURES 4 and 5, spring clips 41 are secured to the bearing blocks 40 and fit over the friction bearings 38 to bias the friction bearings into frictional engagement with the bearing blocks 40. The spring clips serve to retard rotary movement of the shaft 36 to prevent accidental unrolling of the plastic film mounted on the roll shafts 36.

Referring now particularly to FIGURE 7 in conjunction with FIGURE 2, it will be observed that the shaft 36 has a bevelled face 43 formed along the entire length thereof and that complementary apertures 44 are formed within a pair of roll carrier plates 45 to provide a means for mounting the carrier plates on the shaft 36 for corotatable movement therewith.

Each of the carrier plates have outturned tabs 46 formed thereon which are adapted to engage the inner surface of the usual cylindrical cardboard roll 47 upon which plastic films are rolled, to properly position the roll of film on the roll carrier plate 45. Radially extending outturned tabs 48 extend outwardly from the carrier plate in the same direction as the tabs 46 and are adapted to "bite" the inner surface of the cardboard cylinder 47. When a plastic roll having a cylindrical cardboard mounting member such as the member 47 is positioned on the roll carrier plate 45 in the manner illustrated in FIGURE 7 the roll will move corotatably with the carrier plate 45 while the carrier plate will, in turn, move corotatably with the shaft 36 due to the cooperation of the bevelled surface 43 of the shaft 36 with the complementary aperture 44 in the carrier plate 45.

A cam lever 50 is secured to each roll carrier plate 45 and is pivotally mounted thereon by means of a screw 51 and is cooperable with the bevelled face 43 of the shaft 36 to prevent axial movement of the roll carrier plates and the roll mounted therebetween relative to the shaft 36.

Although the bevelled shaft 36 fits relatively snugly within the aperture 44 in the respective roll carrier plates 45, we have found that by effecting a slight twisting movement of the roll carrier plate 45 with respect to the shaft 36 that the carrier plate will be wedged tightly on the shaft 36 so that relative axial movement between the two interconnected members will be prevented. To effect such a wedging action, we provide a cam 52 pivotally eccentrically mounted on plate 45 which is formed integrally with the cam lever 50 and which is engageable with the bevelled face 43 of the shaft 36.

After positioning the carrier plate 45 on the shaft 36 slight depressional movement of the cam lever 50 will act to slightly rotate the shaft and the carrier plate relative to one another so that the carrier plate will become firmly wedged on the shaft 36. It is to be understood that by using only a slight pressure on the cam lever 50 the interconnected members will become so tightly wedged with one another that it would take an extremely large force to axially move the members relative to one another. In this manner, a roll of plastic film such as Mylar or the like may be properly and securely mounted on the shaft 36 for corotatable movement therewith. It will further be understood that the lower roll 17 is also mounted on its respective roll mounting shaft in the same manner as has above been described.

The inner sidewalls 54 and 55 of the laminating assembly have coaxially aligned spaced pairs of apertures 57 and 58 formed therein and pairs of spaced apertures formed below the elongated apertures. A roller shaft 60 is rotatably mounted within the elongated apertures 58 in the sidewalls 54 and 55 while another roller shaft 61 is similarly rotatably mounted in the aperture disposed directly below and spaced from the elongated aperture 58. The roller shafts 60 and 61 each have a resilient cushion or lining 62 formed thereon which, in conjunction with the shafts 60 and 61, constitute the rollers 15 which serve to effect the actual laminating process.

Similarly, a slitter shaft 65 and an anvil shaft 66 are journalled for rotatable movement respectively within the elongated aperture 57 and the aperture formed directly below and spaced therefrom.

A pair of spur gears 68 and 69 are mounted on the outer ends of the shafts 61 and 66, respectively, and lie adjacent the outer surface of the inner sidewall 55. These gears do not mesh with one another but are driven from an output power gear 70 through a drive chain 71 which fits over the peripheral gear teeth on the gears 70, 68, and 69.

As shown most clearly in FIGURE 2, the output power gear 70 is connected by means of an output power shaft 73 to a suitable power source such as the motor illustrated at 74.

As shown most clearly in FIGURES 2, 4 and 5, the ends of the shafts 60 and 65 protruding from the outer face of the inner sidewall 54 have spur gears 73 and 74 mounted thereon for corotatable movement therewith. The gears do not mesh with one another but each gear meshes with a gear of equal diameter mounted on the shaft spaced therebelow. Spur gears 75 and 76 are mounted on the shafts 61 and 66, respectively, and the peripheral teeth on these spur gears are adapted to mesh with the peripheral teeth on the spur gears 73 and 74, respectively.

In this manner the shaft 60 is indirectly driven from the output power gear 70 through the gear chain 71, spur gear 68, shaft 61, spur gear 75, and spur gear 73. The shaft 65 is similarly indirectly driven by the output power gear 70 through the chain 71, the spur gear 69, shaft 66, spur gear 76, and spur gear 74.

As hereinbefore described, the shafts 60 and 61 each have a resilient lining 62 formed thereon and constitute the rollers which feed material through the laminating assembly as will hereinafter become apparent. Thus, when the output power gear 70 rotates in a clockwise direction as viewed in FIGURE 5, the chain 71 will move in a clockwise direction as will the spur gear 68 so that shaft 61 will rotate in a clockwise direction. Since the upper roller is driven by the lower roller by the meshing gears mounted on the outer ends thereof the upper roller will rotate in a counterclockwise direction so that material fed to the point of tangency of the upper and lower rollers will be pulled through the laminating assembly from the left to the right as illustrated in FIGURE 3 by rotation of the rollers.

As shown most clearly in FIGURE 5, a yoke 80 having semicircular cutouts formed along one longitudinal edge thereof overlies the ends of the shafts 60 and 65 which protrude from the sidewall 55 so that the ends of these shafts are received within the semicircular cutouts. A tab 81 extends laterally outwardly from the sidewall 55 and has a spring tension adjusting screw 82 extending therethrough which is threadedly received within an adjusting nut 83. A tension spring 84 interconnects the adjusting screw 82 with the yoke 80 thereby tending to urge the outer ends of the shafts 60 and 65 to their lowermost positions within their respective elongated apertures 58 and 57.

A cover plate 85 extends over the spur gears 73, 74, 75, and 76 and is screwed to the sidewall 54 to cover the gears. A tab 86 extends laterally outwardly from the cover plate 85 and is similar in nature to the tab 81, having an adjusting screw 87 extending therethrough which is threadedly received by a spring tension adjusting nut 88. A tension spring 89 is secured to the adjusting screw 87 and serves to interconnect the adjusting screw with a yoke 90 which is identical to the yoke 80 and which overlies the ends of the shafts 60 and 65 which protrude exteriorly of the cover plate 85 to normally urge the shafts 60 and 65 to their lowermost positions within their respective apertures 58 and 57.

The yoke and spring assembly serves to permit relative movement of the rollers and the shafts 65 and 66 with respect to one another to admit thick material through the laminating assembly. It will be noted that when the thickness of material being passed through the laminating assembly is so great that the gears 73, 75 and 74, 76 have moved apart from one another a sufficient distance to move the respective spur gears out of mesh with one another that all the drive tending to feed the material through the machine will come from the lower roller. The tension springs 84 and 89 will, however, tend to increase the frictional engagement of the material passing through the machine with the lower roller and we have found that such a drive is sufficient to move such thick material through the laminating assembly.

Referring now particularly to FIGURE 3, a pair of identical heater shoes 18 and 19 are shown as being positioned within the housing 11 intermediate the sidewalls 54 and 55 at points spaced forwardly of the rotational axes of the shafts 36 and at points spaced vertically above and below the point of tangency of the feed rollers 15. Each of the shoes is bolted to the sidewalls 54 and 55 and comprises in general an L-shaped member having a bevelled longitudinal edge 94. The bevelled edges 94 of the heater shoes are disposed adjacent to one another and adjacent to and spaced equidistant from a line drawn through the point of tangency of the rollers 15 and act to guide plastic films passing from each of the plastic rolls and over the shoes 18 and 19 through the rollers 15. Heating elements 95 are disposed on the rear surface of the heater shoes 18 and 19 and act to heat the plastic films as they pass over the heater shoes to plasticize the adhesive coating on the plastic films prior to passage of the plastic films through the rollers 15.

As shown in FIGURES 3 and 6, the slitter or trimmer assembly 20 comprises a blade supporting member 95 which has a hexagonal aperture formed centrally therethrough which is complementary with the hexagonal blade shaft 65 so that the member 95 will move corotatably with the shaft 65. The member 95 is stepped so as to form a plurality of annular shoulders 96, 97, and 98 which are formed respectively of progressively smaller diameters.

A cutting blade 100 has a central aperture formed therein which has an inner diameter corresponding approximately to the outer diameter of the annular shoulder 97 so that the blade can be fitted over the shoulder 97. A resilient seal 101 formed of rubber or the like is fitted about the annular shoulder 96 and abuts the blade 100 and serves as a cushion in the slitter assembly when the shafts 65 and 66 have relative vertical movement with respect to one another in a manner which will hereinafter become apparent. It will suffice to note that the cutting blade 100 is pressure dished so that the peripheral edge of the blade extends outwardly and to the left as viewed in FIGURE 6 at an angle of approximately 5° from the center aperture. It will also be noted that the peripheral edge of the cutting blade is tapered as at 102 to provide a sharp cutting edge 103.

A blade retainer 104 has a threaded central aperture formed therein so that the retainer 104 can be threadedly mounted on the threaded shoulder 98 of member 95 to maintain the cutting blade 100 in its proper position. The portion of the retainer 104 which contacts the cutting blade 100 to maintain the cutting blade in its proper position on member 95 is tapered as at 106 to conform with the tapered surface of the blade 100. It will also be noted that the retainer 104 has a slot 107 formed therein adjacent the peripheral edge thereof which is adapted to receive a drive pin 108 which extends from and which may be secured to the blade 100 to thereby key the blade to the blade retainer 104 to effect corotatable movement of the blade 100 with the retainer 104 and consequently with the slitter shaft 65.

A rotating anvil 110 includes a pair of cooperating members 111 and 112 which are identical in construction to members 95 and 104, respectively, and which are secured together in the same fashion as members 95 and 104. The member 11, like the member 95, is slidably mounted on the anvil shaft 66. A resilient seal 113 which corresponds in configuration to the seal 101 is mounted on a diametrically enlarged annular shoulder 114 which corresponds to the shoulder 96 on member 95. A metallic washer 115 has a central aperture formed therein which has an inner diameter substantially equivalent to the outer diameter of a shoulder 116 and is mounted on the shoulder 116.

The peripheral dished edge of the cutting blade 100 extends into the rotating anvil intermediate the members 111 and 112 and the resilient washer 113 acts to bias the metallic washer 115 into engagement with one face of the cutting blade 100. It will further be noted that the washer 115 is formed with a diameter such that the peripheral edge of the washer 115 terminates at a point approximately midway between the inner and cutter circumference of the resilient washer 113 so that the outer edge of the washer 113 adjacent the cutting blade 100 overlaps the peripheral edge of washer 115 and slidably engages one face of the cutting blade 100. The washer 113 in this manner acts as a seal to prevent the entrance of foreign particles such as trimmings or the like from entering the space within the rotating anvil adjacent the peripheral edge of the cutting blade 100. The portion of member 112 which contacts the cutting blade 100 is tapered as at 118 so that only the peripheral edge of member 112 contacts the blade 100 thereby reducing frictional engagement between the two contacting members.

Thus, the point of contact between the peripheral edge of the member 112 and blade 100 is the point at which the actual cutting or trimming of the laminated material passing through the machine is effected.

As shown most clearly in FIGURE 2, two trimmer assemblies are disposed on the shafts 65 and 66 so that each longitudinal edge of the laminated material passing through the laminating assembly can be trimmed.

Each of the slitters 20 is independently axially movable along shafts 65 and 66 by means of yoke assemblies 120. A yoke assembly 120 comprises an internally threaded collar 121 which has a yoke 122 extending outwardly therefrom which has, in turn, a pair of legs 123 which are adapted to be received within an annular groove 124 (see FIGURE 6) in the member 112. The internally threaded collar 121 is, in turn, threadedly mounted on a threaded shaft 125 which has its opposite ends journalled within suitable apertures in the sidewalls 55 and 56. The shaft 125 comprises shaft sections 127 and 128 which are secured together by means of a dowel pin 129 which slidably fits within mating axially directed holes in the mating ends of the shafts 127 and 128 so that the individual shaft sections can have relative rotation with respect to one another while maintaining coaxial alignment. A washer 130 is disposed intermediate the mating ends of the shaft sections 127 and 128 on the pin 129 and has a diameter greater than that of the threaded shaft 125, thus preventing the yoke assemblies from moving off their respective shaft sections.

Each of the shaft sections has its outer end extending outwardly from the sidewalls 55 and 56 a sufficient distance so that knobs 132 (see FIGURE 1) can be mounted thereon and disposed on the exterior of the casing 11 to provide a means for effecting manual rotation of the shafts to position the yoke assemblies and consequently the trimmers in the desired location.

It will thus be observed that when one of the shaft sections is rotated by the knob extending exteriorly of the casing 11, the internally threaded collar 121 will be axially moved along its respective mounting shaft to thereby move the anvil 110 and the slitter 20 axially along their respective shafts 66 and 65 to position the trimmer assembly at a desired point within the laminating assembly.

From the foregoing detailed description, it will be understood that by effecting heating of the plastic film at a point remotely disposed from the rollers 15 "burning" of the paper sheets fed into the laminating assembly is prevented while at the same time a heater means has been provided which eliminates the somewhat costly procedure of having to heat the rollers themselves. Furthermore, if it is found that greater heat must be applied over longer intervals of time to the plastic films to plasticize the adhesive coating thereon, the heater shoes can be enlarged without great expense while enlargement of the rollers might prove quite costly.

Attention is further directed to the means whereby the roll carrier plates 45 are secured to a bevelled shaft 36. The cam lever which is engageable with the bevelled shaft is readily operated and serves to positively grip the bevelled shaft although only a slight pressure is applied to the lever.

The trimmers can be rotatably driven through a single power shaft while each may be individually poistioned in an accurate manner to trim the longitudinal edges of a laminated sheet as desired.

It is to be noted that the laminating assembly which is set forth herein may be very economically produced inasmuch as identical parts have been ussed for different purposes wherever possible. Thus, for instance, each of the heater shoes 18 and 19 is identical as are the mating components 95, 104 and 111, 112 respectively of the trimmer assembly.

It will, of course, herein be understood that this embodiment of the invention has been used for illustrative purposes only and that various modifications and variations in the present invention may be effected without departing from the spirit and scope of the novel concepts thereof.

We claim as our invention:

1. A trimmer assembly for edge trimming of thin sheet material comprising:

a casing having spaced parallel shafts mounted therein, mating movable slitter and anvil blocks mounted on said shafts for axial sliding movement therealong, a circumferential groove formed in each of said mating blocks, thin annular dished metallic slitter and anvil discs carried within the grooves formed in said slitter and anvil blocks, respectively, resilient means carried within the said groove in said anvil block between a wall thereof and the said anvil disc carried therein and biasing such disc into engagement with the convex surface of said slitter blade, and adjustable means positioning one of said blocks on its respective shaft, whereby the interengagement between the peripheral edge of the slitter disc and the groove of said anvil block will cause said blocks to move axially on said shafts with one another.

2. A trimmer assembly constructed in accordance with claim 1 wherein said resilient means comprises a rubber-like annular ring fitted within said anvil block groove and wherein said rubber-like annular ring has an axially protruding annular flange extending therefrom over the peripheral edge of the said disc carried within said anvil groove and into engagement with said slitter disc, whereby to create a wiping action on said slitter disc to prevent the entrance of foreign particles into said anvil groove.

3. A trimmer assembly constructed in accordance with claim 2 wherein resilient means are carried within said slitter block groove intermediate a wall of the said groove and the concave surface of said slitter disc whereby to resiliently bias said slitter disc toward one wall of said slitter blade groove.

References Cited

UNITED STATES PATENTS

| | | | |
|---|---|---|---|
| 863,007 | 8/1907 | Sturevant | 83—499 |
| 1,994,137 | 3/1935 | Leguillon | 83—499 |
| 2,224,370 | 12/1940 | Wescott | 156—499 X |
| 2,373,500 | 4/1945 | Pearce | 156—512 X |
| 2,713,903 | 7/1955 | Smith | 83—499 |

EARL M. BERGERT, *Primary Examiner.*

M. L. KATZ, *Assistant Examiner.*